United States Patent [19]

Kawai et al.

[11] Patent Number: 4,811,147
[45] Date of Patent: Mar. 7, 1989

[54] MAGNETIC HEAD INCORPORATING A GLASS COMPOSITION OF BARIUM OXIDE AND PHOSPHOROUS PENTAOXIDE

[75] Inventors: Yoshihiko Kawai, Tsuzuki; Kazuaki Koyama; Isao Yasuda, both of Katano, all of Japan

[73] Assignee: Sanyo Electric Co. Ltd., Osaka, Japan

[21] Appl. No.: 106,021

[22] Filed: Oct. 8, 1987

Related U.S. Application Data

[63] Continuation of Ser. No. 785,438, Oct. 8, 1985, abandoned.

[30] Foreign Application Priority Data

Nov. 1, 1984 [JP] Japan ................................ 59-230554

[51] Int. Cl.$^4$ .......................... G11B 5/251; G11B 5/12
[52] U.S. Cl. ..................... 360/120; 360/125; 360/127
[58] Field of Search .......................... 501/15, 24, 45; 360/110, 119, 120, 122, 125, 127; 29/603

[56] References Cited

U.S. PATENT DOCUMENTS

| | | | |
|---|---|---|---|
| 3,615,758 | 10/1971 | McMillan et al. | 360/45 X |
| 4,455,384 | 6/1984 | Day et al. | 501/15 |
| 4,475,137 | 10/1984 | Yasuda et al. | 360/125 X |
| 4,544,974 | 10/1985 | West et al. | 360/120 |
| 4,602,307 | 7/1986 | Toriu et al. | 360/125 |

Primary Examiner—John H. Wolff
Attorney, Agent, or Firm—Armstrong, Nikaido, Marmelstein & Kubovcik

[57] ABSTRACT

A magnetic head comprises a main core (1) made of sendust material or amorphous alloy and a pair of reinforcing cores (5,5) for holding the main core so that the main core is sandwiched between the pair of reinforcing cores. The main core (1) is comprised of a pair of core halves (1a, 1b), the pair of core halves being adhered to each other by glass material containing phosphorus pentaoxide ($P_2O_5$) and barium oxide (BaO) as main constituent elements. $P_2O_5$ is about 40% of the whole glass material and BaO is about 50% wt. of the whole glass material.

4 Claims, 2 Drawing Sheets

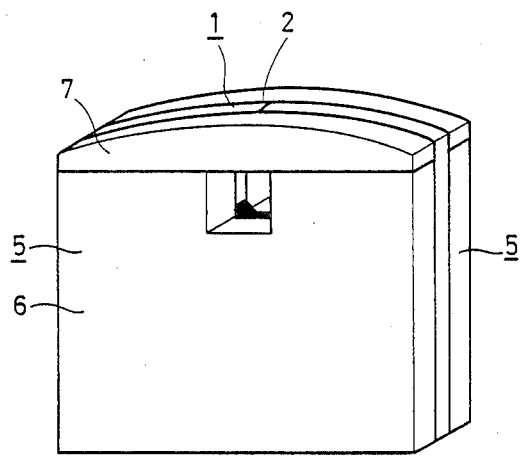
FIG. 1
PRIOR ART
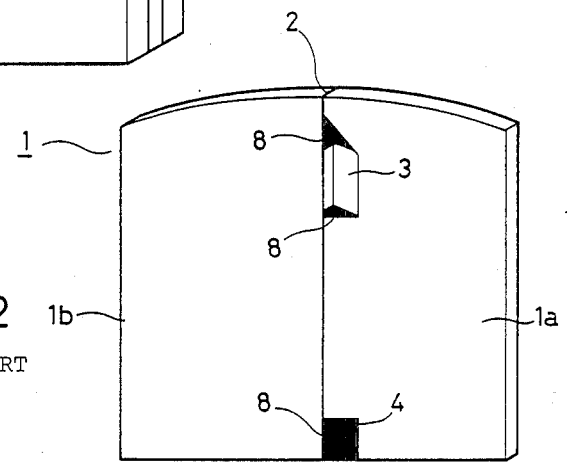
FIG. 2
PRIOR ART
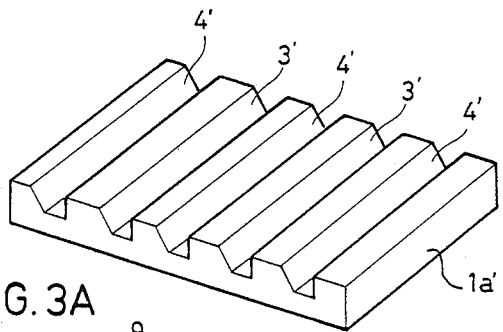
FIG. 3A
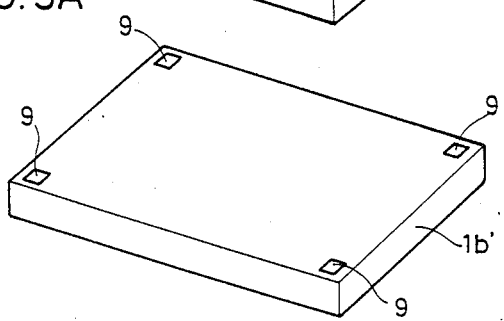

MAGNETIC HEAD INCORPORATING A GLASS COMPOSITION OF BARIUM OXIDE AND PHOSPHOROUS PENTAOXIDE

This application is a continuation of application Ser. No. 785,438 filed 10/8/85 now abandoned.

BACKGROUND OF THE INVENTION

The present invention relates to a magnetic head and, particularly, relates to a magnetic head for use in video applications such as a video tape recorder (VTR), 8 mm VTR (for example, see NIKKEI ELECTRONICS 1983.5.23. pages 111–124), and an electronic still camera (magnetic disc video recording and reproducing apparatus: for example, IEEE TRANSACTIONS ELECTRONICS Vol. CE-28, No. 3. August 1982, "The Electronic Still Camera: A New Concept in Photography").

DESCRIPTION OF THE PRIOR ART

A magnetic recording apparatus for recording and reproducing information through the use of a magnetic medium has played an increasingly important role in our information processing oriented society. Such apparatus has been widely used in many technical fields, including audio, video and digital machines. Since the advent of video tape recorder for recording and reproducing a video for broadcasting, the magnetic recording apparatus has been remarkably developed and commercially available for so-called home video as well as for broadcasting video. In addition, the 8 mm video tape recorder and the electronic still camera have recently been developed. This remarkable development largely depends on the advance of high density magnetic recording technique using a magnetic head and tape.

As far as a magnetic tape for high density magnetic recording is concerned, there has been a trend away from magnetic materials of oxide, such as $\gamma\text{-Fe}_2O_3$, $Co.\gamma\text{-Fe}_2O_3$, to magnetic materials of metal, such as Fe fine particles and Co-Ni evaporation film, which have a substantially strong magnetic characteristic. Following this tendency, there is also a tendency regarding the material for such magnetic head changes away from magnetic material of oxide, including the presently used Mn-Zn ferrite single crystal, to magnetic materials of metal, such as sendust, amorphous ribbon and Co-Zr-Nb thin film.

The magnetic head used in high density magnetic recording described above comprises, in general, a main core formed corresponding to a track width and a pair of reinforcing cores for reinforcing the main core by sanwiching the main core between them. The main core comprises a pair of core halves which are joined to each other along a gap length. In order to record information on a magnetic tape with high density, it is necessary to make the recording frequency higher, in other words, to make the wavelength smaller, the minimum wave length ($\lambda_{min}$) being determined by a magnitude of the gap length (G). The minimum wavelength is approximately equal to twice the gap length ($\mu min \approx 2\,G$). For example, assuming that the minimum wavelength is 0.5 $\mu$m, the gap length of the magnetic head must be made to be 0.25 $\mu$m. Accordingly, very precise machining technique is required, as is improved material suitable for magnetic recording. On the other hand, recording on the magnetic tape is made in response to a leakage flux leaking to the magnetic tape through the gap length, out of magnetic flux formed between a pair of core halves. When a wavelength is short, a curve of leakage flux becomes abrupt, which is suitable for high density magnetic recording. Accordingly, it is important for high density magnetic recording how such leakage flux is made abrupt. Thus, the manner in which a pair of core halves constituting a main core are adhered to each other is a significant problem.

Conventionally, a pair of core halves made of sendust are adhered to each other by using silver solder material (Ag-Cu) alloy. However, since the silver solder partially diffuses into the core halves, joining force is increased whereas permeability of the sendust is decreased, and hence a curve of a leakage flux is broadened, which does not provide an abrupt leakage flux curve. Therefore, another approach has been proposed using glass material instead of a silver solder material. Unlike silver solder material, glass material diffuses very little into core halves and the permeability of the sendust is not adversely affected by the glass. Therefore, a leakage flux curve becomes abrupt and hence, performance can be enhanced for high density recording. Of course, permeability in the vicinity of the head gap largely affects a reproducing output even in the course of reproduction. However, since the glass comprises an oxide whereas the sendust comprises metal material, joining ability between the glass and the sendust is not so good. Accordingly, there has been a dilemma between use of silver solder material and use of glass material, as an adhesive for core halves made of sendust alloy.

Referring to FIGS. 1 and 2, the magnetic head of the prior art will be described in a more particular manner.

FIG. 1 is a perspective view showing a conventional magnetic head, and FIG. 2 is a perspective view showing a configuration of a main core portion of the magnetic head shown in FIG. 1. Such magnetic head is disclosed in the Japanese Patent Laying-Open Gazette No. 222427/1983, for example. Such a magnetic head comprises a main core 1 and a pair of reinforcing cores 5,5 for holding the main core 1 by sandwiching the main core 1 between that pair of reinforcing cores 5,5, as shown in FIG. 1. The main core 1 comprises, as shown in FIG. 2, a pair of core halves 1a, 1b made of magnetic material of alloy such as sendust, which are joined to each other by an adhering means 8,8 such as silver solder material. A gap length 2 is formed between the core halves through such joining, in the front of the main core 1. On the other hand, as shown in FIG. 1, the reinforcing cores 5,5, comprising a portion 6 of magnetic material such as ferrite and a portion 7 of nonmagnetic material such as soda glass, are joined to the main core 1, from both sides thereof, respectively, so that a magnetic head is formed. The main core 1 has a groove 4 provided for applying silver solder material and a groove 3 used for a subsequent coil winding, which grooves are formed in advance. The silver solder material is applied to grooves 3 and 4 and is melted so that the core halves are joined to each other. In FIG. 2, the silver solder material 8 is shown as melted.

However, as described in the foregoing, the magnetic head having sendust core halves 1a, 1b joined to each other by means of silver solder material reveals the defect that the silver solder material diffuses into the sendust core and the recording/reproducing efficiency decreases. In addition, there is another problem that electro-chemical corrosion occurs due to junction of different material i.e., the sendust core and the silver solder material.

Therefore, the inventors have studied specific glass material for overcoming the defect of weak joining force, while still having the specific advantage that, unlike silver solder material, glass material diffuses little and permeability of sendust is not adversely affected by glass and hence a leakage flux curve becomes abrupt and performance can be enhanced from the view point of high density recording.

SUMMARY OF THE INVENTION

Briefly stated, the present invention is directed to a magnetic head comprising a main core formed by a pair of core halves made of alloy material, and a pair of reinforcing cores for holding the main core by sandwiching the main core between the reinforcing cores, the pair of core halves structuring the main core being joined to each other by glass material containing phosphorus pentaoxide ($P_2O_5$) and barium oxide (BaO) as main elements. The glass material contains $P_2O_5$ of 40 to 60 wt.% and BaO of 50–30 wt. % of the whole glass material. Preferably, the glass material contains $P_2O_5$ of 40 wt.% of the whole glass material and BaO of 50 wt.% of the whole glass material. The alloy material comprises a sendust alloy or an amorphous alloy. The gap length between the core halves for the main core is preferably less than 0.3 μm. In addition, the reinforcing core is comprised of a magnetic material portion and a non-magnetic material portion provided in the front of the magnetic material portion.

Accordingly, a primary object of the present invention is to provide a magnetic head in which a joining between a pair of core halves forming a main core is securely achieved using a specific glass material containing $P_2O_5$ and BaO.

In accordance with the present invention, the glass material containing phosphorus pentaoxide ($P_2O_5$) and barium oxide (BaO) as main elements has a small wetting angle and a large joining force with respect to sendust or amorphous alloy and does not diffuse into the sendust or amorphous alloy. Accordingly, the strong magnetic characteristic of the head is not decreased. Furthermore, the joining force is so strong that the gap can not expand and hence the magnetic head is quite stable. In addition, since the glass material is used instead of metal containing adhesive, there occurs no corrosion of the sendust or amorphous alloy which is metal. In addition, since the thermal expansion coefficient of the glass material of the present invention is almost the same as that of sendust and amorphous alloy, the sendust or amorphous alloy and the present glass material expand or contract to almost the same extent when they are heated or cooled. Therefore, a pair of core halves joined to each other are neither separated nor broken. In addition, the present invention is also advantageous with respect to the manufacturing process because the softening point of the present glass material is low.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective vice of a conventional magnetic head;

FIG. 2 is a perspective view showing a configuration of a main core constituting a portion of a magnetic head;

FIG. 3A is a perspective view showing a first wafer and a second wafer for main core structuring a magnetic head of the present invention in an exploded manner;

DESCRIPTION OF THE PREFERRED EMBODIMENTS

TABLE 1

| Sample | Main Elements | Thermal expansion coefficient × $10^{-7}$/C.° | Softening Point (°C.) | Wetting Angle ($\theta$) |
|---|---|---|---|---|
| I | $P_2O_5$ 40% BaO 50% | 143 | 418 | 15° 58' |
| II | $P_2O_5$ 40% PbO 50% | 145 | 377 | 26° 13' |
| III | $P_2O_5$ 50% PbO 40% | 140 | 390 | 38° 03' |

Figure 3B:
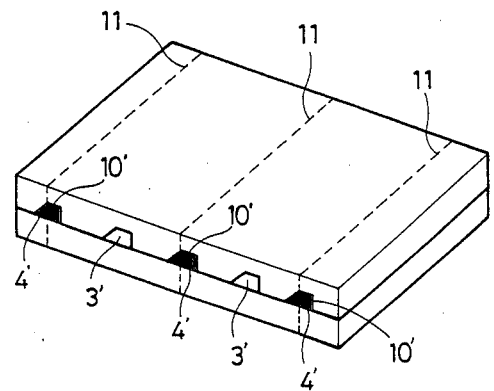
FIG. 3B is a perspective view showing the first and second wafers shown in FIG. 3A with contacting surfaces thereof being joined to each other.
Figure 4:
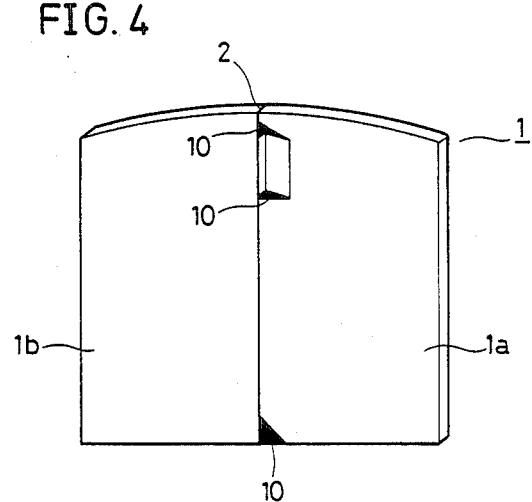
FIG. 4 is a perspective view of a main core of the present invention.

Samples I, II and III of glass material having main elements as shown in Table 1 were prepared. On the other hand, there were provided a first sendust wafer $1a'$ having grooves $3'$ for coil winding and grooves $4'$ provided for melting a glass stick, which grooves $3'$ and $4'$ were alternately formed, and a second sendust wafer $1b'$ having spacers 9 for defining the gap length, the spacers 9 being formed by $SiO_2$ evaporation, with the contacting surfaces thereof being polished to 0.01 m of degree of flatness. Then, as shown in FIG. 3B, the first and second sendust wafers were adapted such that the contacting surfaces thereof abutted each other and the glass Sample I in the form of a stick was inserted to the grooves $4'$ and the abutting first and second sendust wafers with the glass Samples I were disposed in a heating furnace. The softening points of the glass Sample I were recorded as the temperature in the heating furnace is being raised (see the Table 1). At that time, the melted glass Sample I ($10'$) was located in the grooves $4'$, as shown in FIG. 3 and a portion of the melted glass Sample I extended to the grooves $3'$ for coil winding through the gap between the first and second sendust wafers $1a'$ and $1b'$. Subsequently, the first and second sendust wafers $1a'$ and $1b'$ as fixed by melted glass sample were sliced along the dotted lines 11 so that each chip could be obtained. Thereafter, a thickness grinding and lapping in the front portion were provided and then the main core 1 was completed as shown in FIG. 4. The main core 1 comprised the sendust core halves $1a$ and $1b$ which were joined to each other by means of glass material I, that is, glass material 10 containing $P_2O_5$ of 40% in weight and BaO of 50% in weight. Meanwhile, the glass Sample I contained, as the remaining elements, general glass constituents such as CaO, $Na_2O$, and $SiO_2$ which served to make the glass Sample I be more glass.

Similarly, the glass Samples II and III were prepared and used for joining the sendust core halves. As a result, the joining force or strength was inferior in comparison with the Sample I.

Figure 5:
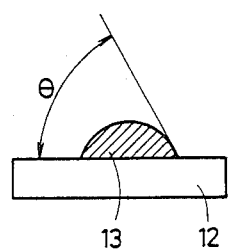
FIG. 5 is a diagram explaining a wetting angle.

As another experiment, as shown in FIG. 5, each of the samples 13 (I, II and III) was placed on a sendust plate 12 and melted, and then wetting angle ($\theta$) was measured. The results are shown in Table 1. As seen from the Table 1, the wetting angle of the Sample I was the smallest, indicating that the Sample I has a strong joining force to the sendust 12. The thermal expansion coefficient of the sendust material is relatively large, that is, $140 \times 10^{-7}$/°C., but the Sample I had a thermal expansion coefficient near the coefficient of the sendust material and hence, almost the same expansion or construction as those of the sendust material are caused by heating or cooling. Therefore, no damage such as break or crack is caused by heating or cooling.

In addition, the wetting angles ($\theta$) concerning the glass material containing $P_2O_5$ and BaO as main elements were measured and the results are shown in Table 2. As a result, it has been found that is effective that the glass material contains BaO of 40 to 60 wt. % and $P_2O_5$ of 30 to 50 wt. %.

TABLE 2

| Composition (weight %) | | | |
| --- | --- | --- | --- |
| BaO | $P_2O_5$ | other elements | Wetting Angle ($\theta$) |
| 50 | 40 | 10 | 15° 58' |
| 40 | 32 | 28 | 20° 18' |
| 60 | 30 | 10 | 24° 58' |
| 40 | 50 | 10 | 21° 08' |

Furthermore, as in the other experiment, melting of glass on amorphous alloy instead of sendust alloy was made. That is, the above described glass Sample I ($P_2O_5$: 40 wt.% and BaO: 50 wt.%) was melted on the amorphous alloy plate and the wetting angle was measured in the same manner as with the sendust alloy. As a result, the wetting angle of 14°12' was obtained. Thus, it has been found that, as an alloy material for main core, amorphous alloy can be used, together with glass material.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A magnetic head comprising,
   a main core (1) comprised of a pair of core halves (1a, 1b) made of a material selected from the group consisting of sendust alloy and amorphous alloy, a gap length of less than 0.3 m being formed between the core halves,
   a pair of reinforcing cores (5, 5) for reinforcing said main core (1) so that the main core (1) is sandwiched between the pair of reinforcing cores (5, 5),
   said pair of core halves being joined to each other by glass material containing phosphorous pentaoxide ($P_2O_5$) in the range of 50 to 30 weight % of the whole glass material, barium oxide (BaO) in the range of 40 to 60 weight % of the whole glass material, and a member selected from the group consisting of calcium oxide (CaO), sodium oxide ($Na_2O$) and silicon dioxide ($SiO_2$), wherein the glass material also contains other elements and compounds in amounts less than those amounts which would alter the basic and novel properties of the glass material.

2. A magnetic head in accordance with claim 1, wherein
   said glass material consists essentially of $P_2O_5$ in an amount of about 40 weight % of the whole glass material and BaO in an amount of about 50 weight % of the whole glass material.

3. A magnetic head in accordance with claim 1, wherein
   said reinforcing cores comprise a magnetic material portion and a non-magnetic material portion.

4. A magnetic head in accordance with claim 1, wherein:
   said reinforcing cores comprise a magnetic material portion and a non-magnetic material portion.

* * * * *